US012383915B2

(12) United States Patent
Turbeville

(10) Patent No.: US 12,383,915 B2
(45) Date of Patent: Aug. 12, 2025

(54) PORTABLE FLUID SPRAYING SYSTEM

(71) Applicant: Vance Turbeville, Kimberly, ID (US)

(72) Inventor: Vance Turbeville, Kimberly, ID (US)

( * ) Notice: Subject to any disclaimer, the term of this patent is extended or adjusted under 35 U.S.C. 154(b) by 400 days.

(21) Appl. No.: 18/104,878

(22) Filed: Feb. 2, 2023

(65) Prior Publication Data

US 2024/0261809 A1 Aug. 8, 2024

(51) Int. Cl.

| | |
|---|---|
| ***B05B 9/00*** | (2006.01) |
| ***B05B 9/04*** | (2006.01) |
| ***B05B 12/08*** | (2006.01) |
| ***B05B 15/656*** | (2018.01) |
| ***H01R 13/66*** | (2006.01) |

(52) U.S. Cl.

CPC ............ *B05B 9/007* (2013.01); *B05B 9/0403* (2013.01); *B05B 12/081* (2013.01); *B05B 15/656* (2018.02); *H01R 13/6675* (2013.01)

(58) Field of Classification Search

CPC ..... B05B 9/007; B05B 9/0403; B05B 15/656; B05B 12/081; B60S 3/044; B60S 3/04; B60S 3/06; H01R 13/6675

See application file for complete search history.

(56) References Cited

U.S. PATENT DOCUMENTS 3,454,042 A 7/1969 Phillips
5,029,758 A * 7/1991 Chayer .................. B60S 3/044 239/588
5,351,640 A 10/1994 Attaway
6,152,707 A * 11/2000 Alberg .................... E03B 11/06 417/423.3
6,189,811 B1 * 2/2001 Rudy .................... F04B 17/006 239/525
7,017,603 B1 * 3/2006 Rosine ................. B65H 75/403 242/395.1
10,087,066 B1 * 10/2018 Hall .......................... B62B 3/02
2010/0243086 A1 * 9/2010 Gilpatrick ............... B08B 3/026 137/565.01
2011/0014066 A1 * 1/2011 Gilpatrick ............... F04B 17/06 417/313
2011/0132413 A1 6/2011 Gans
2011/0162570 A1 7/2011 Moser
2012/0080062 A1 * 4/2012 Parker .................... B44D 3/006 134/198
2014/0339803 A1 * 11/2014 Hammer ................. E03B 1/041 280/830
2017/0012448 A1 * 1/2017 Miller ................... H02J 7/0029

FOREIGN PATENT DOCUMENTS

WO WO2017143942 8/2017

* cited by examiner

*Primary Examiner* — Tuongminh N Pham

(57) ABSTRACT

A portable fluid spraying system for spraying a fluid includes a housing. A pump, a hose, and a tank for containing a fluid are coupled to and positioned in the housing. The pump is activatable to urge the fluid from the tank through the hose. The hose is wound on a reel which is biased to rotate such that the hose winds onto the reel.

12 Claims, 9 Drawing Sheets

PORTABLE FLUID SPRAYING SYSTEM

(g) BACKGROUND OF THE INVENTION

(1) Field of the Invention

The disclosure relates to portable spraying devices and more particularly pertains to a new portable spraying device for spraying a fluid.

(2) Description of Related Art Including Information Disclosed Under 37 CFR 1.97 and 1.98

The prior art relates to devices which are utilized for supplying pressurized fluids in a portable manner.

(h) BRIEF SUMMARY OF THE INVENTION

An embodiment of the disclosure meets the needs presented above by generally comprising a housing with a base wall and a perimeter wall. The perimeter wall is attached to and extends upwardly from the base wall. The base wall and the perimeter wall bound an interior space. The perimeter wall includes a front wall, a rear wall, a first lateral wall, and a second lateral wall. A tank for containing a fluid is coupled to the housing and is positioned within the interior space. A pump is fluidly coupled to the tank and is positioned in the interior space. The pump includes a motor for driving the pump. A supply hose is fluidly coupled to the pump, and the pump is activatable to urge the fluid from the tank through the supply hose. The supply hose extends through the perimeter wall of the housing. A control circuit is electrically coupled to the pump. A reel is rotatably coupled to the housing and is positioned within the interior space. The supply hose is wound onto the reel. The reel includes a torsion spring biased to rotate the reel in a first direction to wind the supply hose onto the reel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
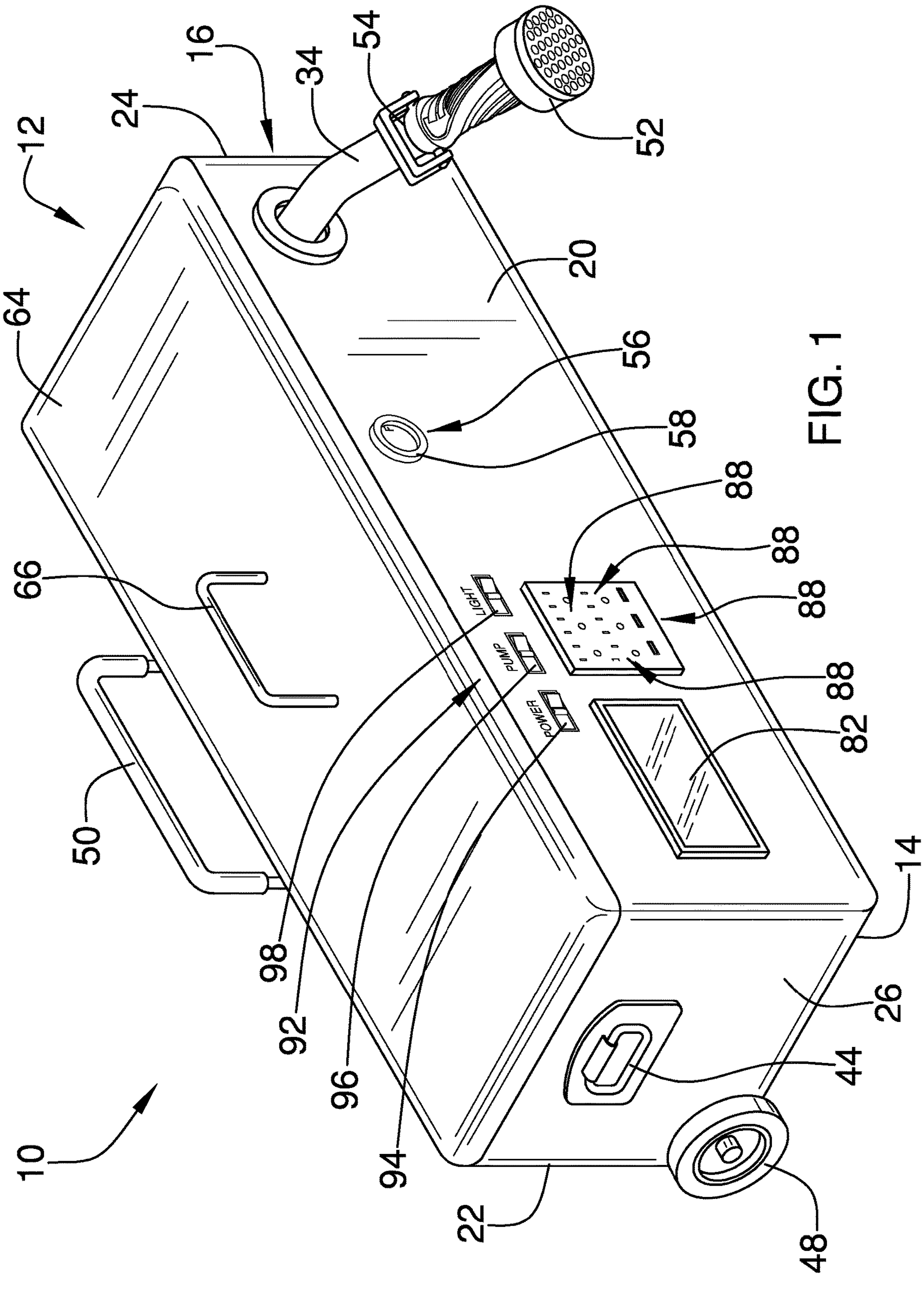
FIG. 1 is a top front side perspective view of a portable fluid spraying system according to an embodiment of the disclosure.
Figure 2:
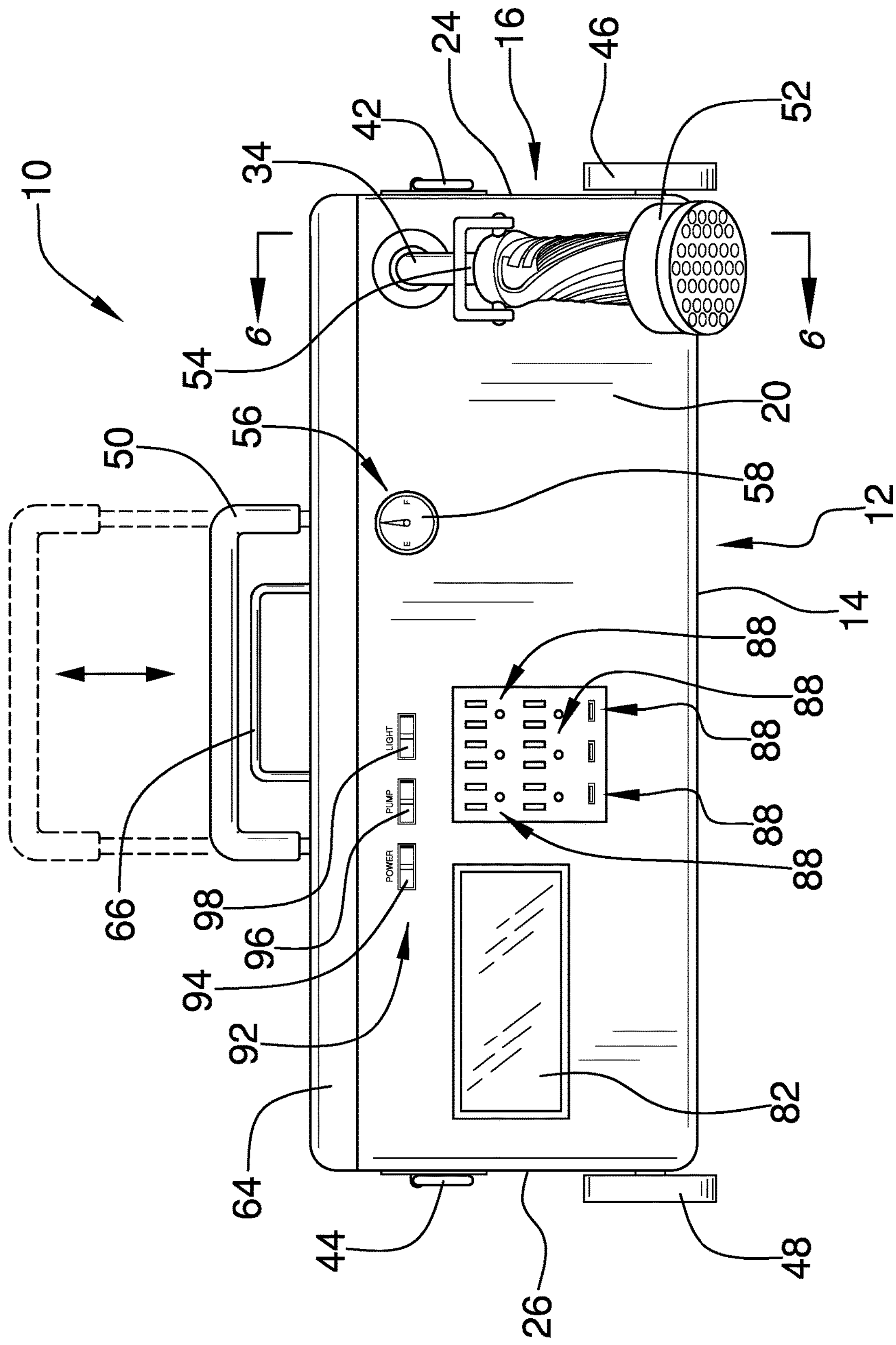
FIG. 2 is a front view of an embodiment of the disclosure.
Figure 3:
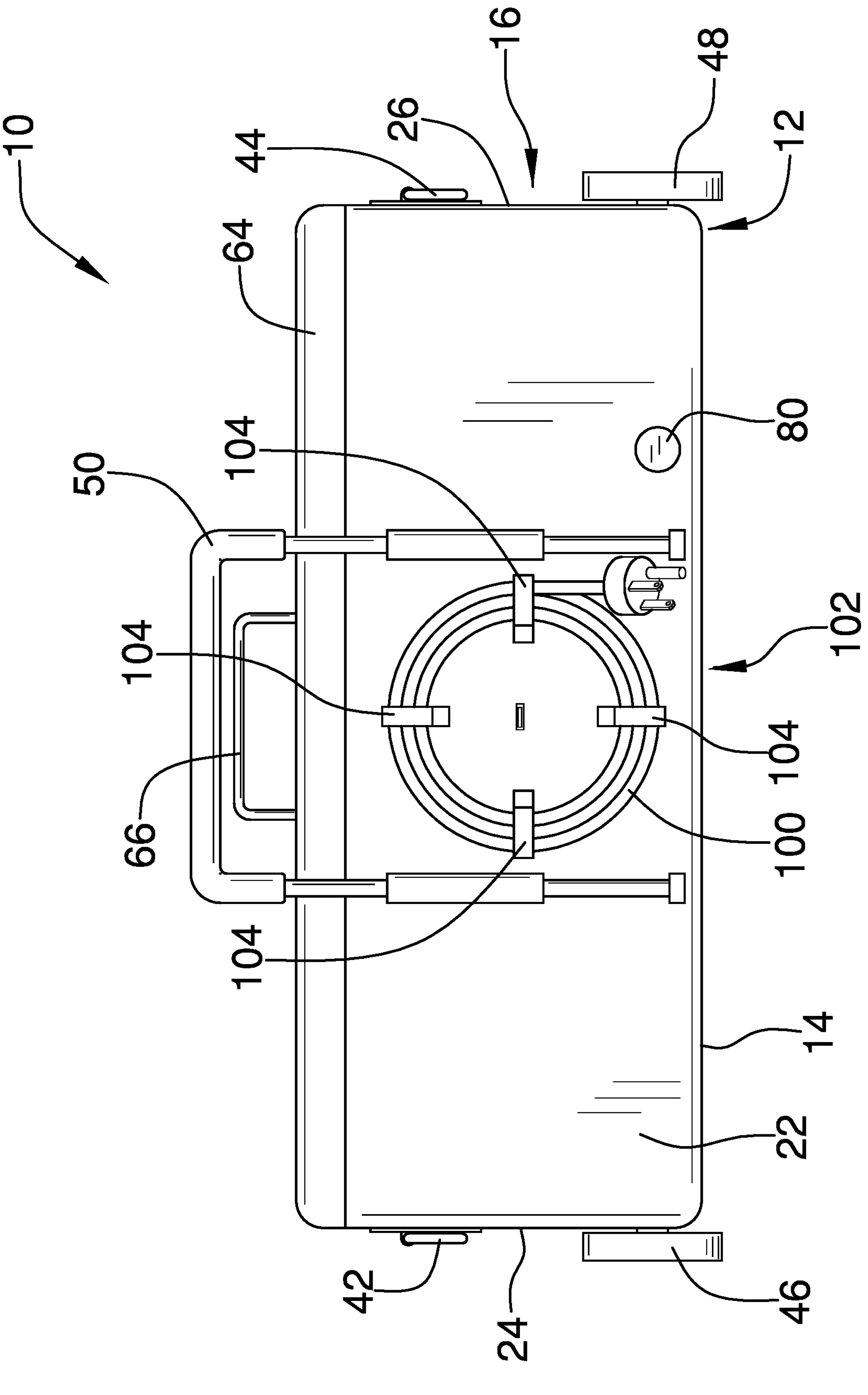
FIG. 3 is a rear view of an embodiment of the disclosure.
Figure 4:
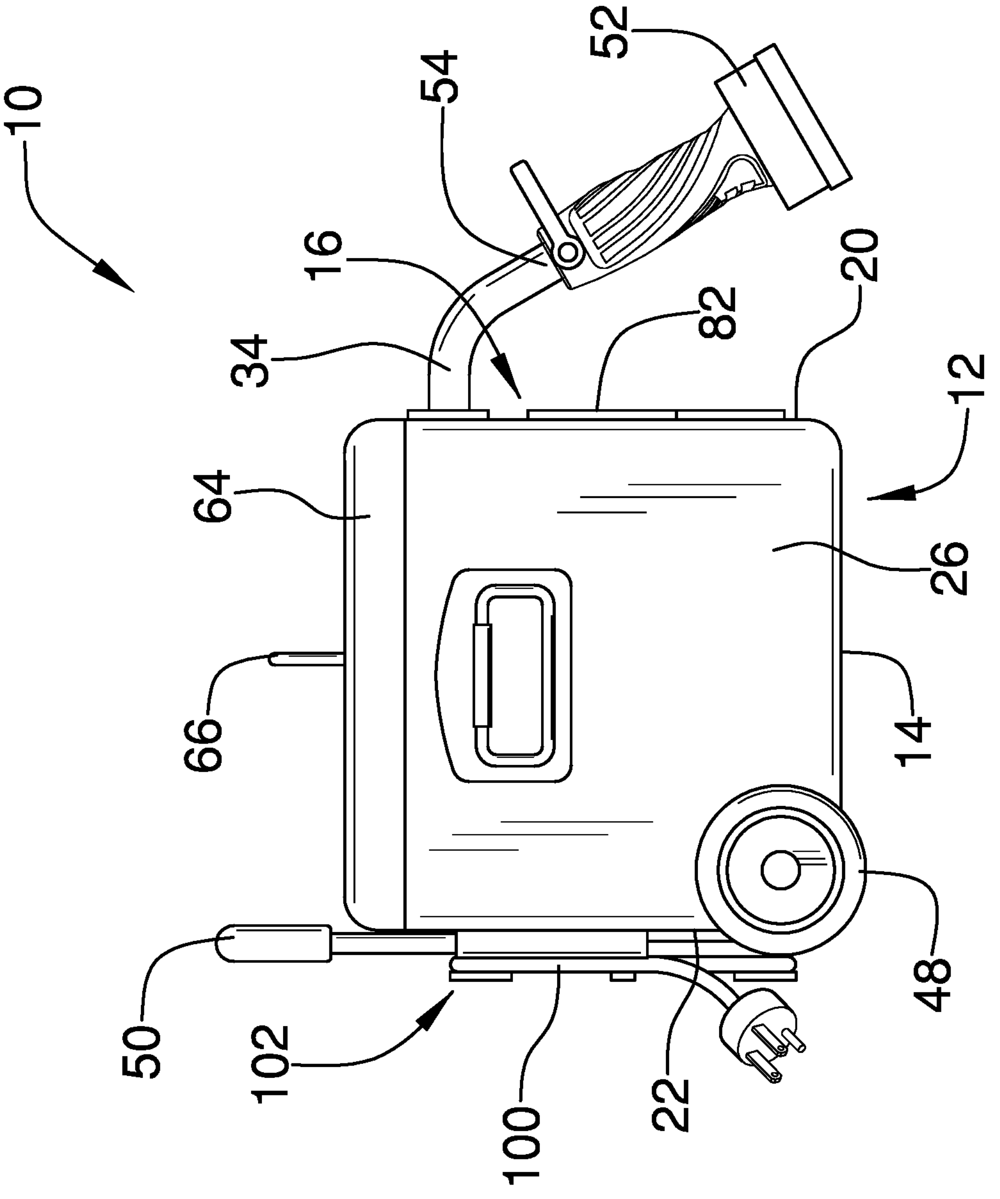
FIG. 4 is a side view of an embodiment of the disclosure.
Figure 5:
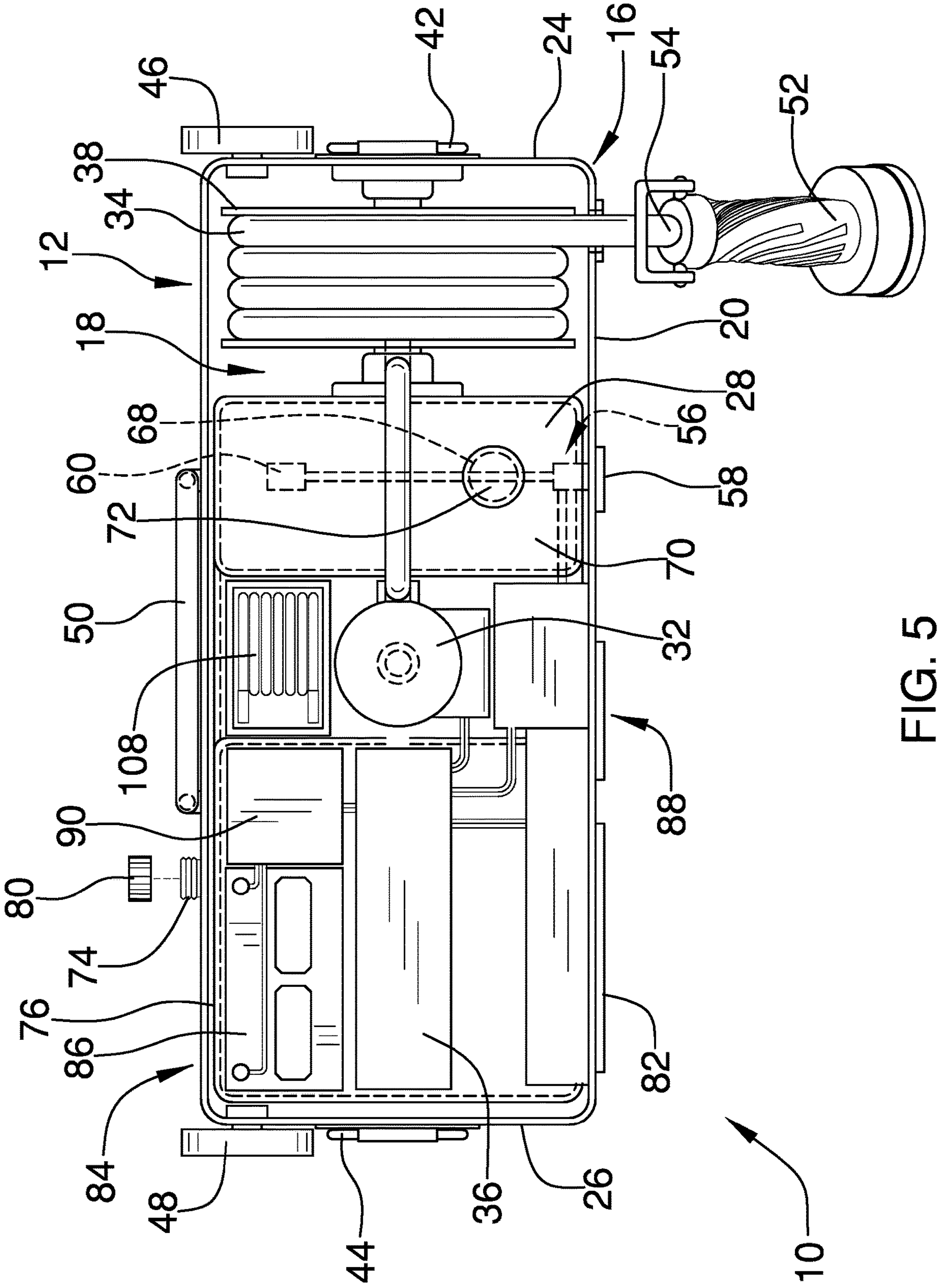
FIG. 5 is a top view of an embodiment of the disclosure with a lid of the system removed from a housing of the system.
Figure 6:
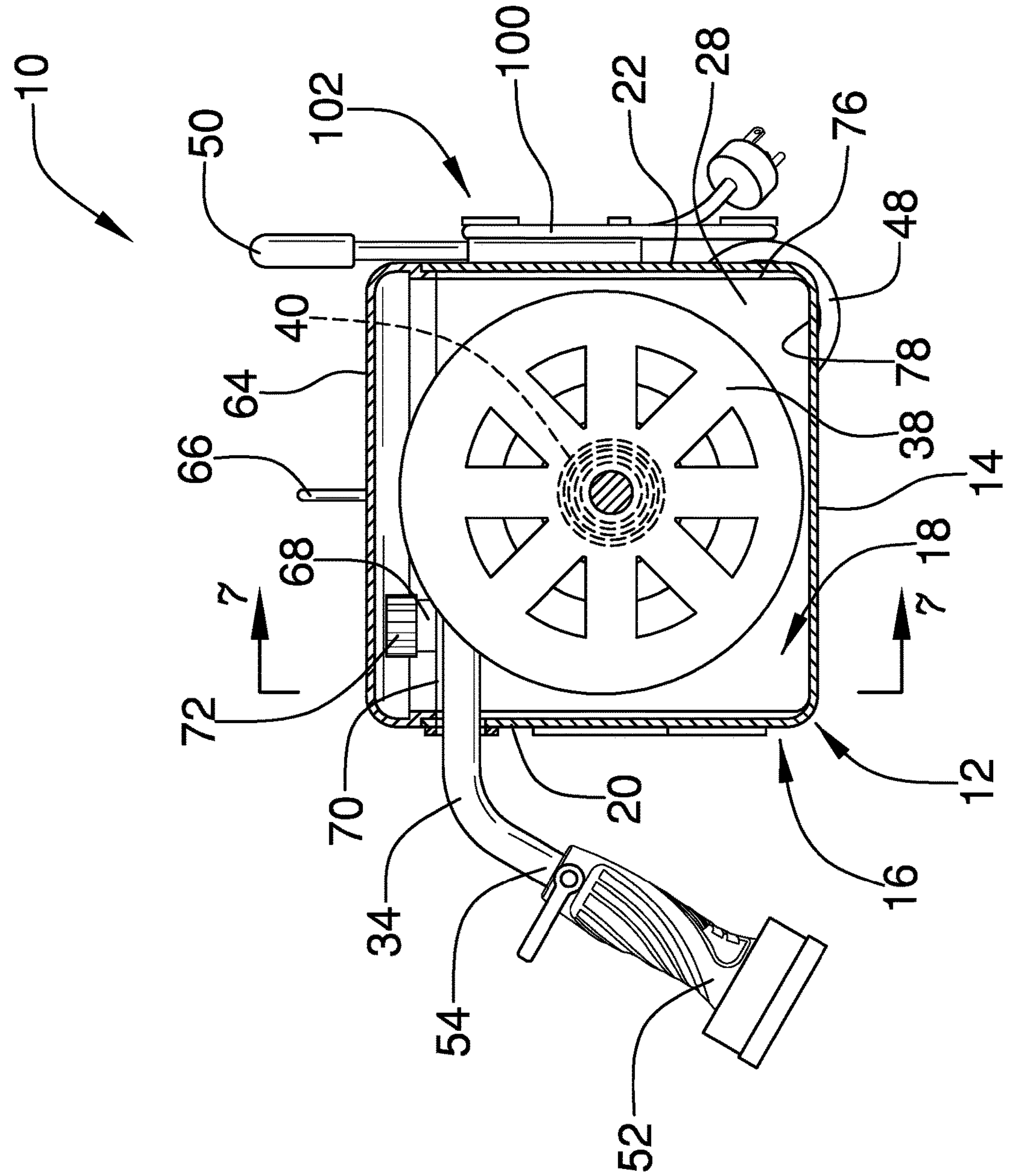
FIG. 6 is a cross-sectional view of an embodiment of the disclosure taken from Arrows 6-6 in FIG. 2.
Figure 7:
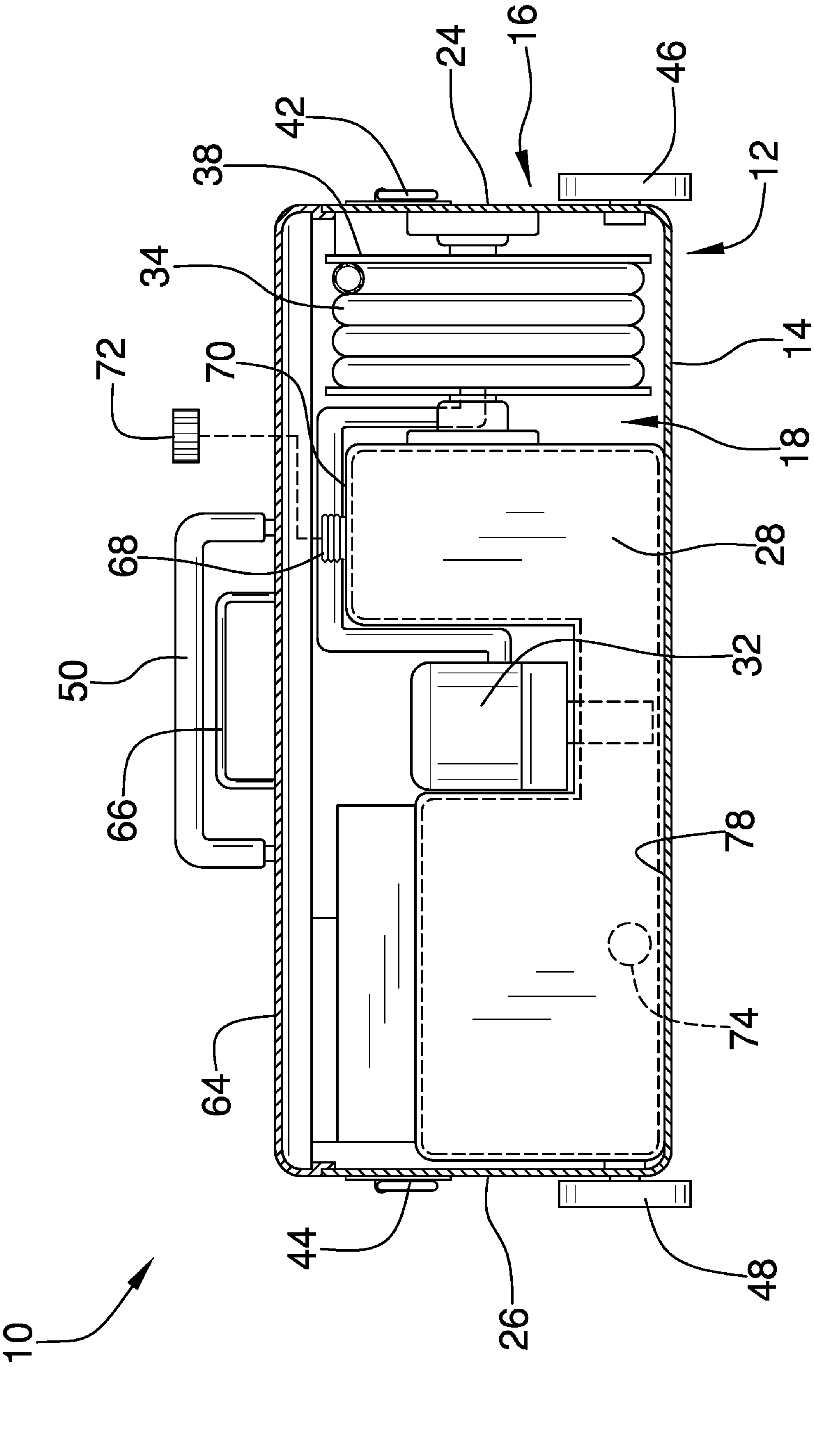
FIG. 7 is a cross-sectional view of an embodiment of the disclosure taken from Arrows 7-7 in FIG. 6.
Figure 8:
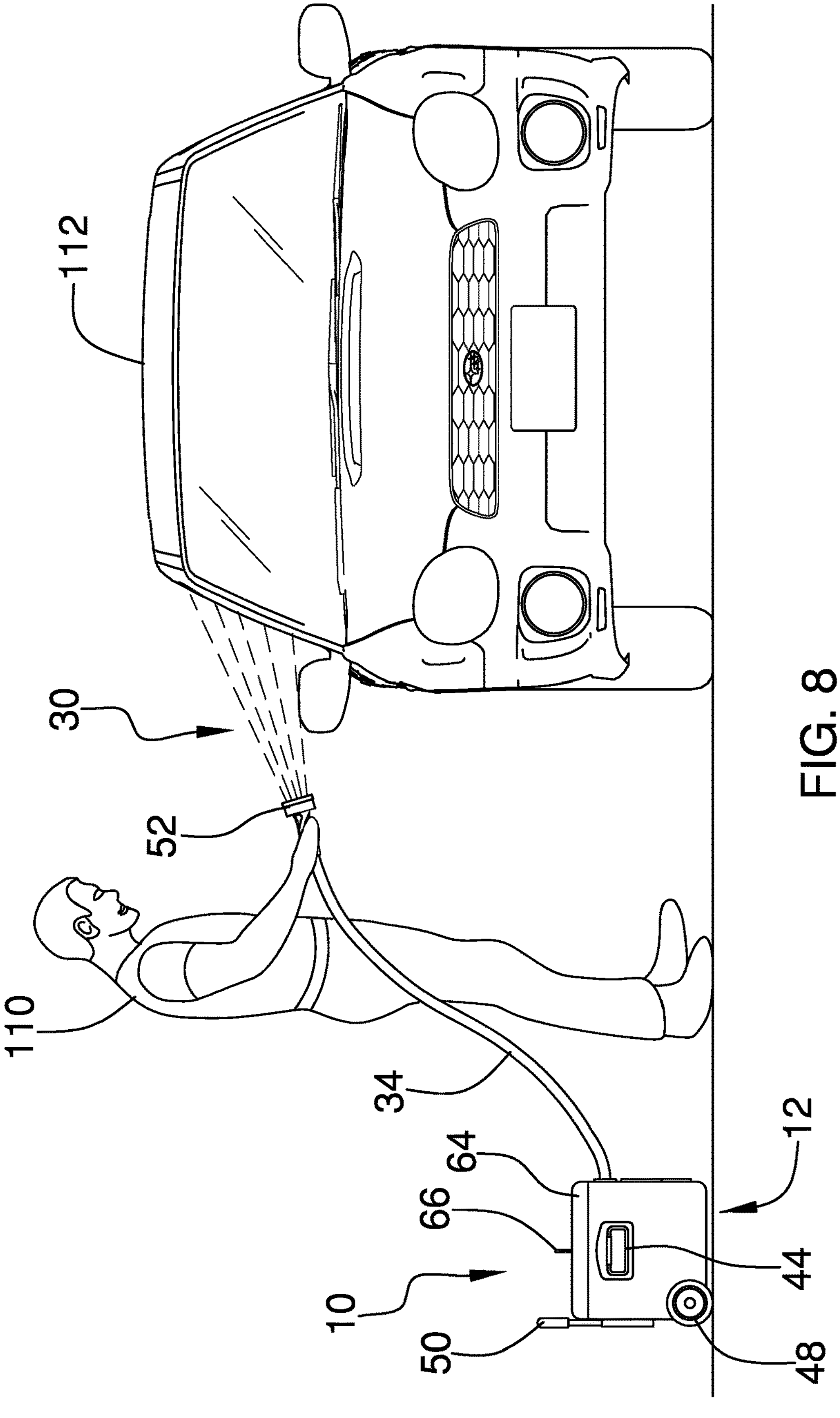
FIG. 8 is an in-use view of an embodiment of the disclosure.
Figure 9:
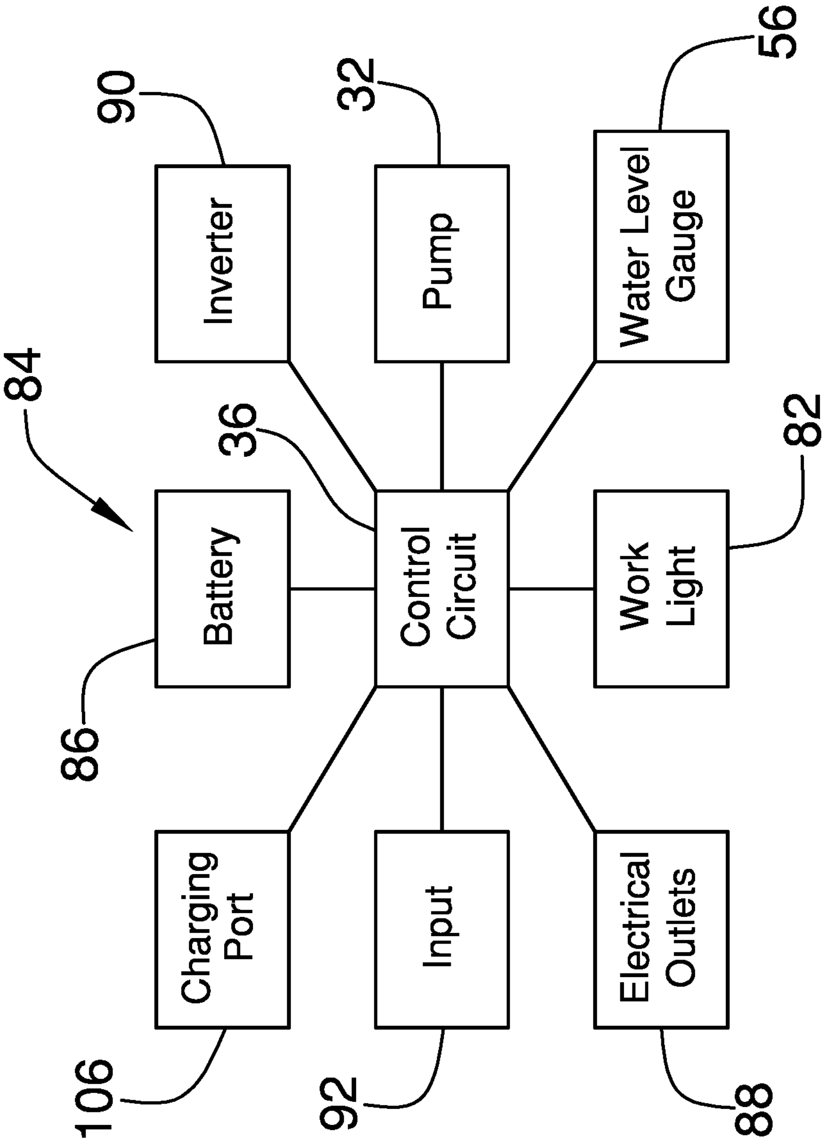
FIG. 9 is a block diagram of an embodiment of the disclosure.

With reference now to the drawings, and in particular to FIGS. 1 through 9 thereof, a new portable spraying device embodying the principles and concepts of an embodiment of the disclosure and generally designated by the reference numeral 10 will be described.

As best illustrated in FIGS. 1 through 6, the portable fluid spraying system 10 generally comprises a housing 12 with a base wall 14 and a perimeter wall 16. The perimeter wall 16 is attached to and extends upwardly from the base wall 14. The base wall 14 and the perimeter wall 16 bound an interior space 18. The perimeter wall 16 includes a front wall 20, a rear wall 22, a first lateral wall 24, and a second lateral wall 26. A tank 28 for containing a fluid 30 is coupled to the housing 12 and is positioned within the interior space 18. A pump 32 is fluidly coupled to the tank 28 and is positioned in the interior space 18. The pump 32 includes a motor for driving the pump 32. A supply hose 34 is fluidly coupled to the pump 32, and the pump 32 is activatable to urge the fluid 30 from the tank 28 through the supply hose 34. The supply hose 34 extends through the perimeter wall 16 of the housing 12. A control circuit 36 is electrically coupled to the pump 32 and is positioned in the interior space 18. A reel 38 is rotatably coupled to the housing 12 and is positioned within the interior space 18. The supply hose 34 is wound onto the reel 38. The reel 38 includes a torsion spring 40 biased to rotate the reel 38 in a first direction to wind the supply hose 34 onto the reel 38.

A first carrying handle 42 is coupled to the first lateral wall 24, and a second carrying handle 44 is coupled to the second lateral wall 26. Each of a first wheel 46 and a second wheel 48 is rotatably coupled to the housing 12. The first wheel 46 is positioned on the first lateral wall 24 of the housing 12 adjacent to the rear wall 22, and the second wheel 48 is positioned on the second lateral wall 26 of the housing 12 adjacent to the rear wall 22. The first wheel 46 and the second wheel 48 have a common rotational axis. An extendable handle 50 is slidably coupled to the rear wall 22 of the housing 12 such that the extendable handle 50 is extendable upwardly from the housing 12.

A nozzle 52 is fluidly coupled to a distal end 54 of the supply hose 34 with respect to the pump 32 for dispensing the fluid 30 from the nozzle 52. A fluid level gauge 56 is in fluid communication with the tank 28 to indicate a level of the fluid 30 within the tank 28. The fluid level gauge 56 is mounted on the housing 12 and includes an indicator dial 58 facing outwardly away from the housing 12. The fluid level gauge 56 is electrically coupled to the control circuit 36 such that the control circuit 36 deactivates the pump 32 when the fluid level gauge 56 indicates that the tank 28 is empty. The fluid level gauge 56 may include a float 60 which is buoyant in the fluid 30 such that it remains near a top surface of the fluid 30 in the tank 28. In such an embodiment, the float 60 is operatively coupled to the indicator dial 58 to indicate a level of fluid 30 contained in the tank 28 and operatively coupled to the control circuit 36 to deactivate the pump 32 when the tank 28 is empty of the fluid 30.

A lid 64 is removably positioned on the housing 12 to cover the interior space 18. A top handle 66 is coupled to and extends upwardly from the lid 64. An inlet tube 68 is fluidly coupled to the tank 28 and is positioned on a top side 70 of the tank 28 such that the tank 28 is fillable via the inlet tube 68. An inlet cap 72 is removably coupled to the inlet tube 68 to selectively close the inlet tube 68. An outlet tube 74 for draining the tank 28 through the outlet tube 74 is fluidly coupled to the tank 28 and is positioned on a rear side 76 of the tank 28 adjacent to a bottom side 78 of the tank 28. The outlet tube 74 extends through the perimeter wall 16 of the housing 12. The outlet tube 74 is externally threaded and is shaped such that the outlet tube 74 may fluidly couple to a garden hose. An outlet cap 80 is removably coupled to the outlet tube 74 to selectively close the outlet tube 74.

A light emitter 82 is coupled to the housing 12 and is positioned on the perimeter wall 16. The light emitter 82 is electrically coupled to the control circuit 36 and is directed to emit light away from the housing 12. A power supply 84 is electrically coupled to the control circuit 36 and is positioned within the interior space 18. The power supply 84 comprises a battery 86. A plurality of electrical outlets 88 is electrically coupled to the control circuit 36 and is positioned on the perimeter wall 16 of the housing 12. A power inverter 90 is electrically coupled to the control circuit 36 for converting direct current electrical power supplied by the power supply 84 into an alternating current electrical power supplied to each electrical outlet 88 of the plurality of electrical outlets 88. The power inverter 90 is also positioned within the interior space 18.

An input 92 is electrically coupled to the control circuit 36 and is positioned on the perimeter wall 16 of the housing 12. The input 92 includes a power switch 94 for selectively supplying electrical power to the plurality of electrical outlets 88, a pump switch 96 for selectively activating the pump 32, and a light switch 98 for selectively activating the light emitter 82. A charging cord 100 for charging the battery 86 is electrically coupled to the control circuit 36 and is coupled to the perimeter wall 16. The charging cord 100 is configured for electrically coupling to an alternating current power source. A cord mount 102 is coupled to the perimeter wall 16 of the housing 12 which comprises a plurality of radially positioned hooks 104 upon which the charging cord 100 is wound. A charging port 106 is electrically coupled to the control circuit 36 and is coupled to the perimeter wall 16. The charging port 106 is configured for receiving electrical power from a direct current power source. A direct current cord 108 is stored in the interior space 18 and is couplable to the charging port 106.

In use, the tank 28 is filled with the fluid 30. The system 10 may be moved to a location where a user 110 desires to spray the fluid 30 by carrying the system 10 with the first and second carrying handles 42 and 44, rolling the system 10 on a surface via the first and second wheels 46 and 48 while grasping the extendable handle 50, or a combination thereof. The supply hose 34 may be unwound from the reel 38 to reach areas the user 110 desires to spray. The pump 32 is activated and the user 110 directs the supply hose 34 toward the desired areas. The fluid 30 may be water, a washing fluid 30 containing soap, a solvent, a surfactant, or the like, or any fluid 30 the user 110 desires to spray. The system 10 may be used, for example, to water plants, wash a car 112 or boat, and the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable fluid spraying system comprising:

a housing having a base wall and a perimeter wall, the perimeter wall being attached to and extending upwardly from the base wall, the base wall and the perimeter wall bounding an interior space, the perimeter wall including a front wall, a rear wall, a first lateral wall, and a second lateral wall;

a tank for containing a fluid being coupled to the housing and being positioned within the interior space;

a pump being fluidly coupled to the tank and being positioned in the interior space, the pump including a motor for driving the pump;

a supply hose being fluidly coupled to the pump, the pump being activatable to urge the fluid from the tank through the supply hose, the supply hose extending through the perimeter wall of the housing;

a control circuit being electrically coupled to the pump;

a reel being rotatably coupled to the housing and being positioned within the interior space, the supply hose being wound onto the reel, the reel including a torsion spring biased to rotate the reel in a first direction to wind the supply hose onto the reel;

a first wheel and a second wheel each being rotatably coupled to the housing, the first wheel being positioned on the first lateral wall of the housing adjacent to the rear wall, the second wheel being positioned on the second lateral wall of the housing adjacent to the rear wall, the first wheel and the second wheel having a common rotational axis;

a fluid level gauge being in fluid communication with the tank to indicate a level of the fluid within the tank, the fluid level gauge being mounted on the housing and includes an indicator dial facing outwardly away from the housing, the fluid level gauge being electrically coupled to the control circuit such that the control circuit deactivates the pump when the fluid level gauge indicates that the tank is empty;

a lid being removably positioned on the housing to cover the interior space; and a top handle being coupled to and extending upwardly from the lid;

an inlet tube being fluidly coupled to the tank and being positioned on a top side of the tank, wherein the tank is fillable via the inlet tube; and an inlet cap being removably coupled to the inlet tube to selectively close the inlet tube;

an outlet tube for draining the tank through the outlet tube being fluidly coupled to the tank and being positioned on a rear side of the tank adjacent to a bottom side of the tank, the outlet tube extending through the perimeter wall of the housing, the outlet tube being externally threaded and being shaped such that the outlet tube is configured for coupling to a garden hose;

an outlet cap being removably coupled to the outlet tube to selectively close the outlet tube;

a light emitter being coupled to the housing and being positioned on the perimeter wall, the light emitter being directed to emit light away from the housing, the light emitter being electrically coupled to the control circuit; and a power supply being electrically coupled to the control circuit, the power supply being positioned within the interior space.

2. The system of claim 1, further comprising a first carrying handle and a second carrying handle, the first carrying handle being coupled to the first lateral wall, the second carrying handle being coupled to the second lateral wall.

3. The system of claim 1, further comprising an extendable handle being slidably coupled to the rear wall of the housing, the extendable handle being extendable upwardly from the housing.

4. The system of claim 1, further comprising a nozzle being fluidly coupled to a distal end of the supply hose with respect to the pump for dispensing the fluid from the nozzle.

5. The system of claim 1, wherein the power supply comprises a battery.

6. The system of claim 1, further comprising:

a plurality of electrical outlets being electrically coupled to the control circuit and being positioned on the perimeter wall of the housing; and a power inverter being electrically coupled to the control circuit for converting direct current electrical power supplied by the power supply into an alternating current electrical power supplied to each electrical outlet of the plurality of electrical outlets, the power inverter being positioned within the interior space.

7. The system of claim 6, further comprising an input being electrically coupled to the control circuit and being positioned on the perimeter wall of the housing, the input including a power switch for selectively supplying electrical power to the plurality of electrical outlets.

8. The system of claim 1, further comprising an input being electrically coupled to the control circuit and being positioned on the perimeter wall of the housing, the input including a pump switch for selectively activating the pump.

9. The system of claim 1, further comprising an input being electrically coupled to the control circuit and being positioned on the perimeter wall of the housing, the input including a light switch for selectively activating the light emitter.

10. The system of claim 5, further comprising a charging cord for charging the battery, being electrically coupled to the control circuit and being coupled to the perimeter wall, the charging cord being configured for electrically coupling to an alternating current power source.

11. The system of claim 10, further comprising:

a cord mount being coupled to the perimeter wall of the housing, the cord mount comprising a plurality of radially positioned hooks, the charging cord being wound onto the cord mount;

a charging port being electrically coupled to the control circuit and being coupled to the perimeter wall, the charging port being configured for receiving electrical power from a direct current power source; and a direct current cord being stored in the interior space, the direct current cord being couplable to the charging port.

12. A portable fluid spraying system comprising:

a housing having a base wall and a perimeter wall, the perimeter wall being attached to and extending upwardly from the base wall, the base wall and the perimeter wall bounding an interior space, the perimeter wall including a front wall, a rear wall, a first lateral wall, and a second lateral wall;

a tank for containing a fluid being coupled to the housing and being positioned within the interior space;

a pump being fluidly coupled to the tank and being positioned in the interior space, the pump including a motor for driving the pump;

a supply hose being fluidly coupled to the pump, the pump being activatable to urge the fluid from the tank through the supply hose, the supply hose extending through the perimeter wall of the housing;

a control circuit being electrically coupled to the pump, the control circuit being positioned in the interior space;

a reel being rotatably coupled to the housing and being positioned within the interior space, the supply hose being wound onto the reel, the reel including a torsion spring biased to rotate the reel in a first direction to wind the supply hose onto the reel;

a first carrying handle and a second carrying handle, the first carrying handle being coupled to the first lateral wall, the second carrying handle being coupled to the second lateral wall;

a first wheel and a second wheel each being rotatably coupled to the housing, the first wheel being positioned on the first lateral wall of the housing adjacent to the rear wall, the second wheel being positioned on the second lateral wall of the housing adjacent to the rear wall, the first wheel and the second wheel having a common rotational axis;

an extendable handle being slidably coupled to the rear wall of the housing, the extendable handle being extendable upwardly from the housing;

a nozzle being fluidly coupled to a distal end of the supply hose with respect to the pump for dispensing the fluid from the nozzle;

a fluid level gauge being in fluid communication with the tank to indicate a level of the fluid within the tank, the fluid level gauge being mounted on the housing and including an indicator dial facing outwardly away from the housing, the fluid level gauge being electrically coupled to the control circuit such that the control circuit deactivates the pump when the fluid level gauge indicates that the tank is empty;

a lid being removably positioned on the housing to cover the interior space;

a top handle being coupled to and extending upwardly from the lid;

an inlet tube being fluidly coupled to the tank and being positioned on a top side of the tank, wherein the tank is fillable via the inlet tube;

an inlet cap being removably coupled to the inlet tube to selectively close the inlet tube;

an outlet tube for draining the tank through the outlet tube being fluidly coupled to the tank and being positioned on a rear side of the tank adjacent to a bottom side of the tank, the outlet tube extending through the perimeter wall of the housing, the outlet tube being externally threaded and being shaped such that the outlet tube is configured for coupling to a garden hose;

an outlet cap being removably coupled to the outlet tube to selectively close the outlet tube;

a light emitter being coupled to the housing and being positioned on the perimeter wall, the light emitter being directed to emit light away from the housing, the light emitter being electrically coupled to the control circuit;

a power supply being electrically coupled to the control circuit, the power supply being positioned within the interior space, the power supply comprising a battery;

a plurality of electrical outlets being electrically coupled to the control circuit and being positioned on the perimeter wall of the housing;

a power inverter being electrically coupled to the control circuit for converting direct current electrical power supplied by the power supply into an alternating current electrical power supplied to each electrical outlet of the plurality of electrical outlets, the power inverter being positioned within the interior space;

an input being electrically coupled to the control circuit and being positioned on the perimeter wall of the housing, the input including:

a power switch for selectively supplying electrical power to the plurality of electrical outlets;

a pump switch for selectively activating the pump; and a light switch for selectively activating the light emitter;

a charging cord for charging the battery being electrically coupled to the control circuit and being coupled to the perimeter wall, the charging cord being configured for electrically coupling to an alternating current power source;

a cord mount being coupled to the perimeter wall of the housing, the cord mount comprising a plurality of radially positioned hooks, the charging cord being wound onto the cord mount;

a charging port being electrically coupled to the control circuit and being coupled to the perimeter wall, the charging port being configured for receiving electrical power from a direct current power source; and a direct current cord being stored in the interior space, the direct current cord being couplable to the charging port.

* * * * *